Patented Nov. 7, 1944

2,362,003

UNITED STATES PATENT OFFICE 2,362,003

TRIETHANOLAMINE HYDROCHLORIDE COMPOSITION FOR COCCIDIOSIS

Paul D. Harwood, Ashland, Ohio, assignor to Dr. Hess & Clark, Inc., Ashland, Ohio, a corporation of Ohio No Drawing. Application September 8, 1942, Serial No. 457,652

3 Claims. (Cl. 167—53.1)

My invention relates to a therapeutic agent useful in the condition known as coccidiosis or bloody diarrhea of chickens. Avian coccidiosis may be caused by a number of species, but one form, Eimeria tenella, which attacks the ceca of the domestic fowl is more serious than the others. This species of parasite is the usual cause of bloody diarrhea.

Heretofore, a number of medicaments have been proposed for this condition, but many possess a little or no efficacy, others are too expensive to warrent use on poultry, while others have to be administered for a long period before the appearance of symptoms in order to be effective. The object of my invention, therefore, is to provide a useful agent for the control of cecal coccidiosis, a disease which causes a high mortality among chicks in the brooder house.

I have found that triethanolamine is of value in the therapy of cecal coccidiosis when employed as the salt of a common acid such as hydrochloric acid. Because of the strongly basic character of triethanolamine, the pure compound is too caustic for administration directly to living birds, but this difficulty is overcome when triethanolamine hydrochloride is employed.

The preparation of triethanolamine hydrochloride for administration to poultry is accomplished as follows:

Ordinary commercial triethanolamine is sufficiently pure and adequate for the purposes of this invention and the same is true of hydrochloric acid as purchased from commercial sources. Triethanolamine is placed in a suitable vessel and the hydrochloric acid added slowly. Upon admixture the two compounds react causing considerable heat and such heat must be dispersed by suitable means such as a water bath. The addition of hydrochloric acid is continued with vigorous stirring until the pH of the mixture is neutral to litmus. This point may be approximated by the appearance of the mixture for the reason that while both triethanolamine and hydrochloric acid are liquid the result of the reaction being triethanolamine hydrochloride is a solid. Therefore, when the reaction nears completion the contents of the reacting vessel are a thick slush consisting of triethanolamine hydrochloride and water. This mixture is spread out thinly on appropriate pans or vessels and the water removed by evaporation at moderate temperatures. The end product obtained after drying being the triethanolamine hydrochloride used in our experimental treatment of avian coccidiosis.

Experimental coccidiosis, caused by Eimeria tenella, follows a definite course. Vague symptoms which first appear toward the end of the fourth day, consist of a little blood in the feces, and the chicks are depressed and huddle together as if for warmth. On the fifth day the first deaths occur, there is much blood in the feces, and the chicks are listless, pale, and obviously ill. Deaths continue numerous on the 6th and 7th days. Nine days after infection the survivors are mostly well on the road to recovery and at this time many investigators terminate their experiments. I have followed this custom.

Clinical outbreaks in the field are similar, except that the infection is acquired at various times by the different members of the flock, and consequently, the alert poultryman may notice symptoms in a few birds within his flock before the epidemic becomes general. For this reason such treatments as the inclusion of 40% dried milk in the mash, or of 5% sulphur, are thought by some to be of value, although it is known that these remedies must be given prior to the time of infection.

From experiments carried out it was found that ten out of seventeen control chicks died while only eleven out of forty-two chicks treated with 5% triethanolamine hydrochloride in the mash died of a similar infection. The treatment with triethanolamine hydrochloride commenced from nine days before infection to four days after infection. Since triethanolamine hydrochloride is effective when given subsequent to the date of infection, it will prove more valuable than the 40% milk mash treatment, which has been used widely in the past. Also the average gain in weight of the surviving treated chicks is slightly greater than the average weight gain of untreated chicks. Therefore, the weights of surviving chicks also suggest that treatment with triethanolamine hydrochloride is beneficial in the condition known as cecal coccidiosis of fowls.

In the practical application of my treatment, I prefer to administer triethanolamine hydrochloride in the feed to affected flocks because the individual bird is of low economic value and individual dosing is, therefore, tedious. Treatment should be commenced as soon as any birds in the flock show symptoms of coccidiosis and continued for a period of five to nine days, depending on the duration of the epidemic. Ordinarily after one outbreak, the birds in the flock will be so resistant to cecal coccidiosis that a repetition of the treatment will not be necessary. However, if triethanolamine hydrochloride should prove to be effective against intestinal types of coccidiosis as well as against cecal types repetition of treatment may be desirable in some instances. In experiments conducted thus far a mixture containing 5% triethanolamine hydrochloride has proved to be the optimum mixture, but mixtures containing from 4% to 10% triethanolamine hydrochloride possesses considerable virtue for the treatment of cecal coccidiosis in fowls.

Having thus described my invention what I claim is:

1. A poultry food having as an ingredient thereof triethanolamine hydrochloride.

2. A mash food for chicks exposed to infection by avian coccidiosis which comprises not less than 4% and not more than 10% of triethanolamine hydrochloride.

3. A mash food for chicks exposed to infection by avian coccidiosis which comprises substantially 5% of triethanolamine hydrochloride.

PAUL D. HARWOOD.